United States Patent
Hickson et al.

(10) Patent No.: US 6,226,641 B1
(45) Date of Patent: May 1, 2001

(54) ACCESS CONTROL FOR GROUPS OF RELATED DATA ITEMS

(75) Inventors: Andrew Hickson, West Wellow; James Gordon Wilkinson, Southampton, both of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/024,545

(22) Filed: Feb. 17, 1998

(30) Foreign Application Priority Data

Oct. 7, 1997 (GB) .................................................. 9721141

(51) Int. Cl.$^7$ ...................................................... G06F 17/30
(52) U.S. Cl. ................................................................ 707/8
(58) Field of Search ............................ 707/8, 9; 711/147; 709/106

(56) References Cited

U.S. PATENT DOCUMENTS 5,355,477 * 10/1994 Strickland ................................ 707/8
5,485,607    1/1996 Lomet et al. ......................... 395/600
5,566,319 * 10/1996 Lenz ..................................... 711/147

FOREIGN PATENT DOCUMENTS

92107592 * 11/1993 (EP) ..................................... 711/147

OTHER PUBLICATIONS

"MQSeries Application Programming Guide" SC33–O807, Eighth edition (Aug. 1997), pp. 34–35.

* cited by examiner

*Primary Examiner*—Wayne Amsbury
(74) *Attorney, Agent, or Firm*—Edward H. Duffield

(57) ABSTRACT

Access to groups of related items which are accessible by multiple processes in a computer system is controlled, in response to determining that an individually accessed data item is part of a group, by marking the whole group as locked and returning an unlocking key to the process accessing the original data item. Further access to any items of the group by a process is prevented except on provision of the key. The invention is particularly applicable to messages in a message queuing system which are logically grouped and yet may be individually destructively retrieved.

36 Claims, 6 Drawing Sheets

ACCESS CONTROL FOR GROUPS OF RELATED DATA ITEMS

FIELD OF THE INVENTION

The present invention relates to controlling access to groups of related data items stored in the memory of a multiprocessing computer system in which multiple processes may independently access individual data items. In particular, the invention relates to locking techniques for controlling such access.

BACKGROUND OF THE INVENTION

As used herein, the term "multiprocessing" should be understood to include not only computer systems having distinct independent multiple processors but also so-called "multi-threading" systems in which independent process threads can exist concurrently. The term "process" includes any application program.

Wherever multiple processes have access to shared data, it is well known that access restrictions are necessary to prevent unwanted overwriting by one process or application of data items which another application may be in the process of using. The object is to achieve serialisation, that is that the result of processing for any application should be the same as if it had had sole access to the data items and had processed them serially. Such restrictions are commonly achieved by locking data items so that other applications cannot access them at all (exclusive locks) or so that other applications can only access them for a non-destructive purpose such as reading their contents (shared locks).

Very sophisticated locking arrangements are used in database products where many users have access to the shared data in the data base. One form of database is hierarchical, such as the IMS product from IBM ("IMS" and "IBM" are trademarks of International Business Machines Corporation). In such a database, it is known that not only can individual items be locked but that also that locking of a top layer item in the hierarchy can be used to lock all subordinate segments depending from the top layer item.

Often, database managers employ index trees of keys to individual data items to speed up searching for those items and these index trees can be used as the basis for locking. The trees consist of root, branch and leaf nodes (which are pointers to the actual data items). Not only can individual leaf nodes be locked but also their parent nodes (branch nodes or even root nodes). If a branch or root node is locked then all its child nodes are also locked.

U.S. Pat. No. 5,485,607 "Concurrency control method and apparatus in a database management system utilizing key-valued locking", describes a system in which keys, rather than actual data items, are used for locking and mentions a concept known as "range-locking" where not only are individual key values locked but also ranges of keys, including the individual keys of interest are also locked.

In data bases, the data may be changed relatively infrequently and is usually read non-destructively. However, the need for locking arises in other types of system as well, however. One type of system in which locking has been practised is a message queuing system, such as IBM's MQSeries family of products (the term "MQSeries" is a trademark of International Business Machines Corporation). In message queuing systems, communication between programs residing on different nodes of a network is by means of queues onto which the programs put messages or from which they get messages for use by other programs. Management of these queues is under control of a queue manager.

Because queues may, in general, be accessible to more than one application, MQSeries products need to be able to lock messages on queues in order to ensure their integrity. This is particularly so as the MQSeries "GET" operation is normally destructive of the message as the whole purpose is to allow applications to remove the message from the queue for processing after which its retention on the queue serves no purpose.

In a recent extension of MQSeries, it has been recognised that groups of messages may be logically related or that very large messages, which are too large for the system buffers may have to be segmented into a group of related segments. This concept is described in the "MQSeries Application Programming Guide" (SC33-0807-07, Eighth Edition, August 1997), available from IBM. However, a problem has arisen in that locking of an individual message in a group or of a segment in a segmented message will not necessarily prevent other applications removing the related messages or segments before a requesting application has had a chance to process them. As such messages are in an unstructured peer group and are not hierarchically arranged or within quantifiable ranges, the prior art locking techniques cannot provide an effective locking option for the group.

SUMMARY OF THE INVENTION

Accordingly, the present invention provides a method of controlling access to an unstructured group of related data items stored in the memory of a multiprocessing computer system in which multiple processes may independently access individual data items to perform operations thereon, comprising the steps of: accessing an individual data item as part of a process; determining that said item is part of a group of related items; locking said group of related items by marking the whole group as locked and returning a locking key to said process such that further access to any item of said group is prevented except on provision of said key, said locking of said group occurring in response to the accessing of any one of said individual items in that group.

The invention offers a locking technique which is applicable to unstructured groups or peer groups of logically related items as may occur, for example, in a queue of messages and does not depend on the items being arranged hierarchically or in an ordered quantifiable sequence. Locking of the items does not require them to be accessible by way of an index tree of key values pointing to the items.

Preferably, the group has a shared data structure and said locking step comprises setting a group locked flag in said group data structure, said further access to the individual data items of the group including the step of checking whether said group locked flag is set or not.

It is preferred that the locking key should be stored in the group data structure for comparison with the key provided in further access requests. However, it could instead be stored in any convenient area of memory.

The preferred locking method is to individually mark said first accessed data item as locked and to generate the shared locking key in response to locking of the first accessed data item. The key is then passed to the group data structure. It is not absolutely necessary, however, that the first accessed data item should be individually marked as locked if the group structure is marked.

The invention finds particular utility where the group of related data items are held in a queue. A preferred feature of the invention in this case is that the locking key include a sequence number indicating the order in which the first accessed data item was put on the queue. Where the invention is applied to a computer system which includes a message queuing system in which the data items are messages put onto such queues and taken from queues in response to execution of process instructions of said multiple processes, the locking steps are preferably part of a browse operation to access the messages non-destructively.

In such a system where a message queue is opened by a process, the process preferably returns a handle which must be used in subsequent accesses of the queue, the locking key being associated with said handle.

The invention also provides an access control system for controlling access to related groups of data items in a multiprocessing computer system, according to the above method.

BRIEF DESCRIPTION OF THE DRAWINGS

The invention will now be described by way of example only with reference to a preferred embodiment thereof as illustrated in the accompanying drawings in which.

DETAILED DESCRIPTION OF THE INVENTION

In a preferred embodiment, the invention is implemented as part of a messaging and queuing system, specifically one of IBM's MQSeries family of messaging and queuing computer program products as described in the above referenced Applications Programming Guide. As described therein, MQSeries programs are installed on processing nodes of a computer network, which may be heterogeneous in nature, in order to enable applications to communicate with each other or to enable a distributed application to communicate between its various parts. MQSeries programs employ an asynchronous messaging and queuing technique in which messages may be put on to queues by means of an MQPUT call for subsequent access and retrieval by another application using an MQGET call. Before these operations can be carried out, queues must be opened by means of an MQOPEN call, under control of a queue manager. The MQOPEN, MQPUT and MQGET calls require the application programmer to specify parameters indicating options which are to apply to the particular call.

Figure 1:
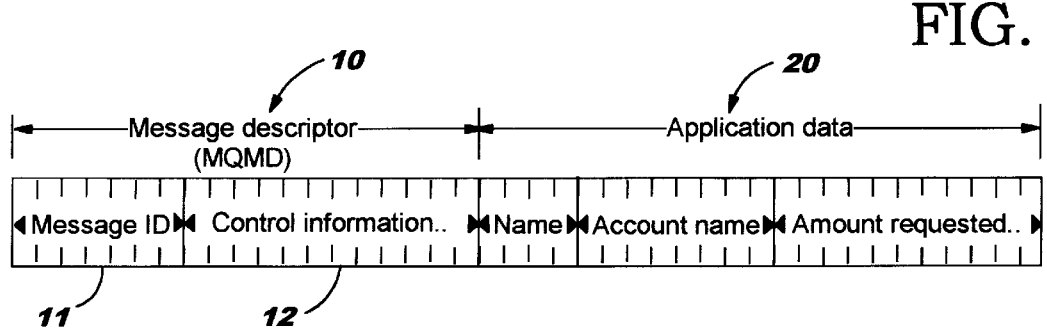
FIG. 1 shows the structure of a message in a message queuing system to which the invention may be applied.

The general format of the messages used in MQSeries products is shown in FIG. 1. As can be seen, the message consists of a message descriptor (MQMD) 10 and application data 20, in this example financial account data, which is the application message content. The message descriptor consists of a Message ID 11 and control information 12. The control information includes many fields, one of which, for example, is a message type field (MsgType) which indicates whether the message is a datagram, request, reply or report message. Not all the control fields will be described here as they are not relevant to the present invention.

When an application program uses the MQOPEN call to open a queue, the queue manager returns a unique identifier, called the "object handle", by which the application program knows the object. The application program must pass the object handle as an input parameter when it subsequently issues MQPUT, MQGET and other calls to that queue.

Figure 2:
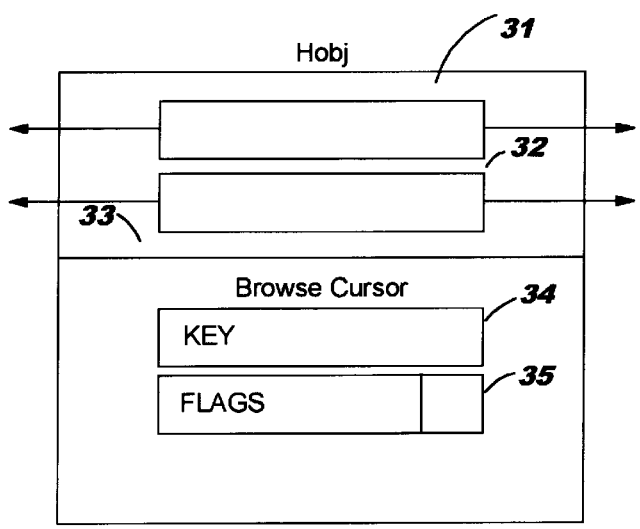
FIG. 2 shows an object handle storage area in such a message queuing system.

In fact, the object handle is or can be mapped to an address pointer to an area of storage, in which information associated with permitting the application to access the queue is stored. This area is illustrated in FIG. 2 and contains data and pointers 31, 32 to other object handle storage areas.

One option which is frequently specified in an MQOPEN and subsequent MQGET call is a browse option which allows messages to be non-destructively accessed. A browse cursor is established which may be thought of as a logical pointer initially positioned before the first message on the queue and subsequently stepped through the remaining messages. Normally, messages in the queue are read in first-in-first-out order subject to a message priority field and the browse cursor will progress through them in this order. The browse cursor is shown at 33 in the object handle storage area.

To use the MQGET call to browse the messages on a queue, MQOPEN is called to open the queue for browsing, specifying the MQOPEN option MQOO_BROWSE. To browse the first message on the queue, MQGET is called with the MQGET option MQGMO_BROWSE_FIRST specified. To find further messages MQGET is called repeatedly with the MQGMO_BROWSE_NEXT option to step through many messages. The message ID and certain other fields of the MQMD structure must be set to null after each MQGET call in order to see all messages. Finally, MQCLOSE is called to close the queue.

One option that has been provided for use with the browse option is a lock option. This may be specified if another program (application or thread) is likely to try to get the same message before the current application has finished with it. The message is locked by specifying the MQGET message option MQGMO_LOCK and unlocked by specifying MQGMO_UNLOCK.

Messages may thus be locked by an application thread so that no other thread or application may access that message until it has been either destructively retrieved or unlocked by the application thread that locked it.

Figure 3:
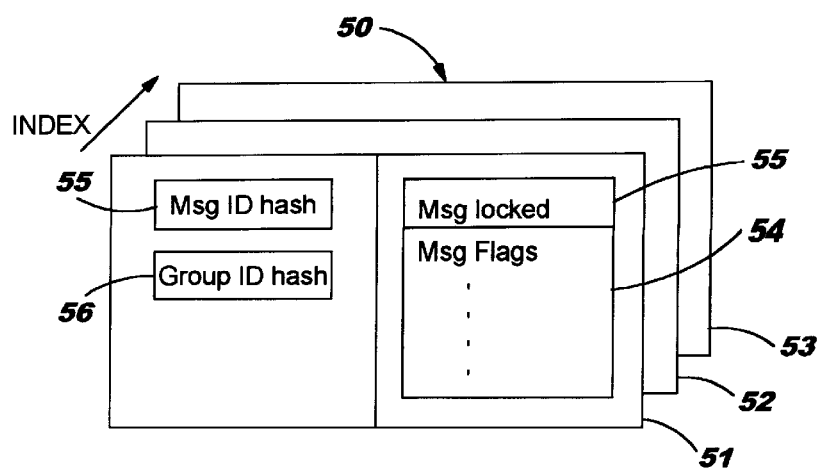
FIG. 3 shows a message space table used in the message queuing system including fields used in the practice of the invention.

The locking mechanism utilises both a unique queue Message Sequence number which is allocated serially as messages are initially stored on the queue, and a Message Space Table 50 shown in FIG. 3, which has entries 51, 52, 53 for every existing message on the queue. Each Message Space Table entry includes a hashed version 56 of the Message ID which can be used to make a preliminary selection of a message without getting the full message details. The Message Space Table is accessible to the Browse Cursor which traverses it via a message index for Space Table entries. Reference to the message index converts it into a pointer to the address of a space table entry. Each Space Table Entry also includes some message status flags 54. One of these status flags is designated as the Message Locked bit 55. A locked message has its Message Locked bit set, and the Message Sequence number of the locked message is stored in the browse cursor as a key 34 (FIG. 2) as also is a copy 35 of the Message Locked flag.

On subsequently attempting to access the locked message using either the same or a different object handle, the Message Locked bit will be found. The Message Sequence number of the locked message is then compared with the key (if any) in the browse cursor. If it fails to match, the message is considered to be locked. If it matches, the locked message is being accessed by the handle by which it is locked, and the lock does not prevent access. When the locked message is destructively retrieved, the Space Table entry, including the Message Locked bit, for that message, disappears.

The known locking option is only valid for single messages. However, MQSeries programs now allow a number of messages to be logically associated in a group and also allow for large individual messages to be segmented.

Figure 4:
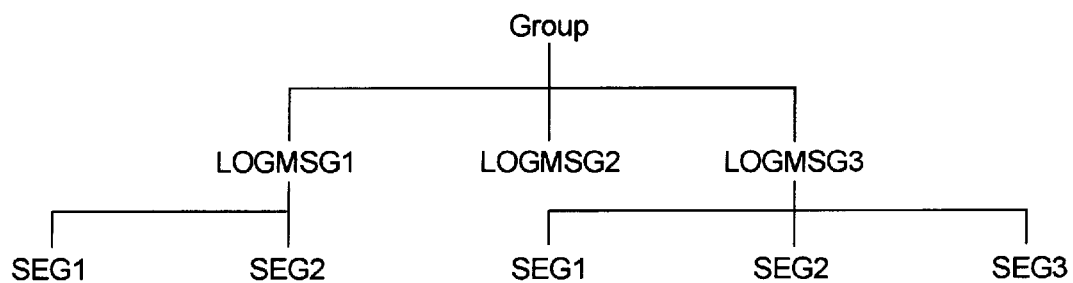
FIG. 4 illustrates a known message group and segment hierarchy in a message queuing system.

With reference to FIG. 4, the hierarchy within a group is as follows:

"Group" is the highest level in the hierarchy and is identified by a GroupId in the message descriptor. It consists of one or more messages that contain the same GroupId. These messages can be stored anywhere on the queue. A hashed version of the GroupId of a grouped message is stored at 57 in the Message Space Table.

"Logical messages" within a group are identified by the GroupId and by a MsgSeqNumber field in the message descriptor. The MsgSeqNumber starts at 1 for the first message within a group, and if a message is not in a group, the value of the field is 1. (Note that the group MsgSeqNumber is not the same as the Message Sequence Number used in the Message Space Table to identify the order in which messages are put on a queue.) Logical messages within a group can be used to:

Ensure ordering (if this is not guaranteed under the circumstances in which the message is transmitted).

Allow applications to group together similar messages (for example, those that must all be processed by the same server instance).

Each message within a group consists of one physical message, unless it is split into segments. Each message is logically a separate message, and only the GroupId and MsgSeqNumber fields in the MQMD need bear any relationship to other messages in the group. Other fields in the MQMD are independent; some may be identical for all messages in the group whereas others may be different. For example, messages in a group may have different format names, character code set identifiers (CCSIDs), encodings, and so on.

"Segments" are used to handle messages that are too large for either the putting or getting application or the queue manager (including intervening queue manager through which the message passes).

A segment of a message is identified by the GroupId and MsgSeqNumber fields and an Offset field. The Offset field starts at zero for the first segment within a message.

Each segment consists of one physical message that may or may not belong to a group. A segment is logically part of a single message, so only the MsgId, Offset, and SegmentFlag fields in the MQMD should differ between separate segments of the same message.

Figure 5:
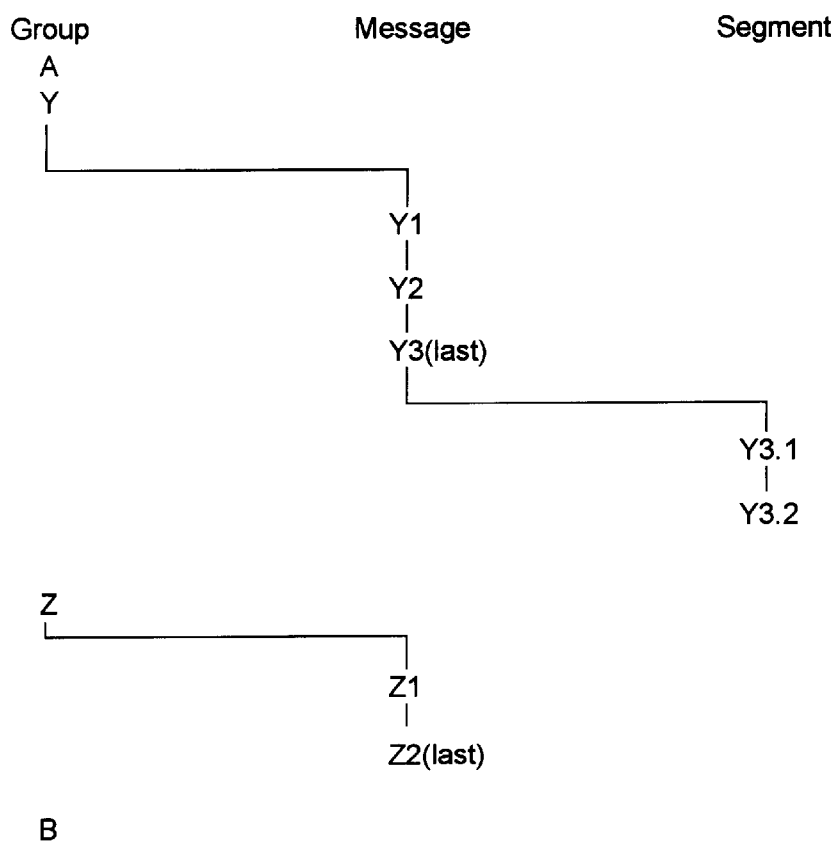
FIG. 5 illustrates one possible physical order of messages on a queue in the hierarchy of FIG. 4.

It should be realised that the logical and physical order of grouped or segmented messages on a queue may differ. This is because groups can arrive at a destination at similar times from different applications, therefore losing any distinct physical order, or because, even within a single group, messages may get out of order due to rerouting or delay of some of the messages in the group. For example, the logical order on a queue may look like FIG. 5.

These messages would appear in the following order on a queue:
1. Message A (not in a group but logically a single message unsegmented group)
2. Logical message 1 of group Y
3. Logical message 2 of group Y
4. Segment 1 of (last) logical message 3 of group Y
5. (Last) segment 2 of (last) logical message 3 of group Y
6. Logical message 1 of group z
7. (Last) logical message 2 of group z
8. Message B (not in a group)

Figure 6:
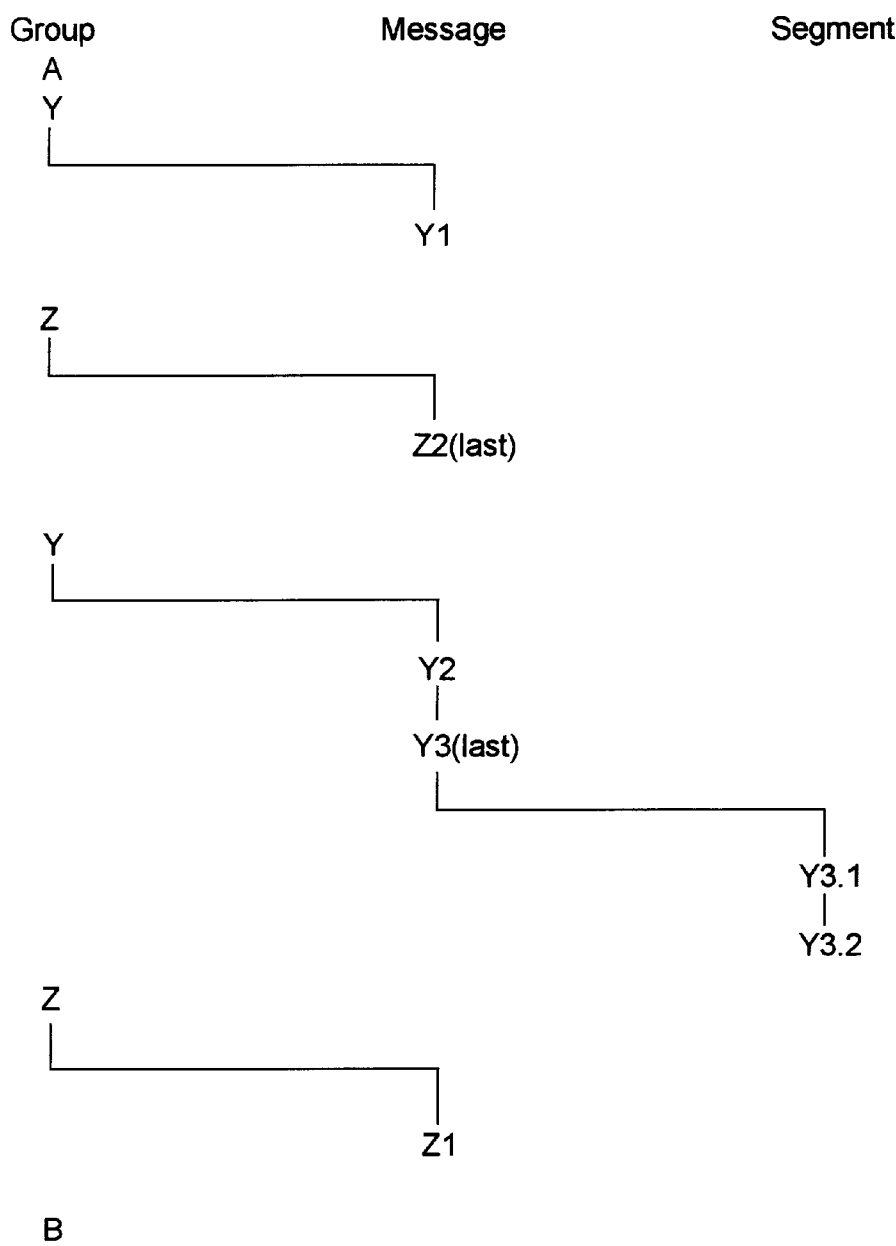
FIG. 6 illustrates another possible physical order of messages on a queue in the hierarchy of FIG. 4.

The physical order on the queue, however, might be entirely different. For example, if groups Y and Z arrived at similar times, and message 2 of group Z overtook message 1 of the same group, the physical order would look like FIG. 6.

These messages would appear in the following order on the queue:
1. Message A (not in a group)
2. Logical message 1 of group Y
3. Logical message 2 of group z
4. Logical message 2 of group Y
5. Segment 1 of (last) logical message 3 of group Y
6. (Last) segment 2 of (last) logical message 3 of group Y
7. Logical message 1 of group z
8. Message B (not in a group).

When getting messages, the option MQGMO_LOGICAL_ORDER can be specified in order to retrieve messages in logical rather than physical order. This operation makes use of flags in the MQMD and also in the section 54 of the Message Space Table such as Message-in Group (MIG) and Last Message-in Group (LMIG) flags.

If messages are in logical groups or are segmented, the retrieval of the entire group must be carried out by the same getting application instance. However, if other applications have access to the queue on which the group is present, it is possible that these other applications may destructively retrieve (GET) one of the constituent messages of a group or the constituent segments of a message.

Figure 7:
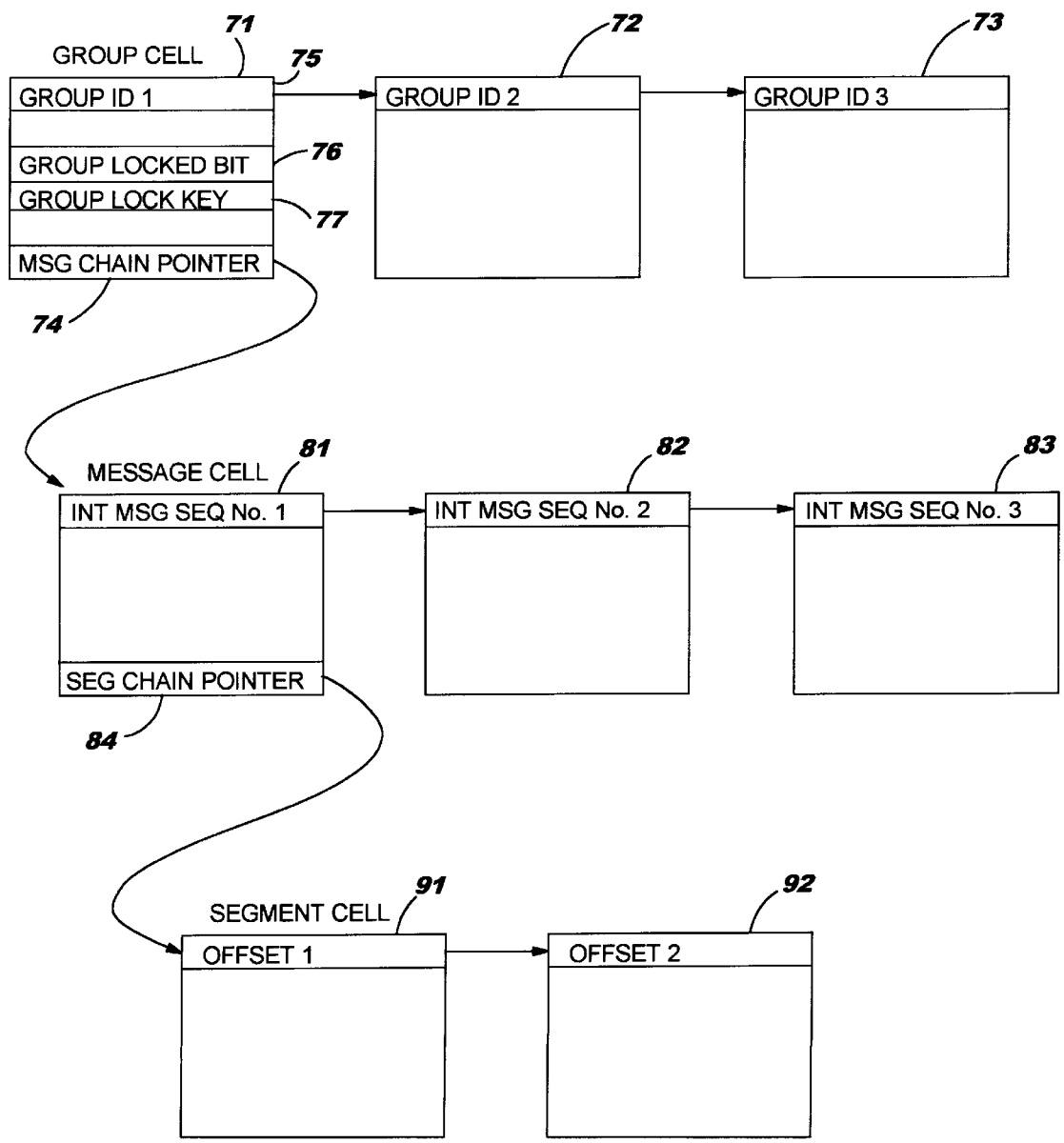
FIG. 7 illustrates a group map structure including fields used in the practice of the present invention.

In accordance with the invention, an extended locking technique is provided to prevent this. This makes use of a Group Map structure shown in FIG. 7 which is created in memory and corresponds to the hierarchy of FIG. 4.

For each open queue, a Group Map structure is created to keep track of Grouped and Segmented Messages. At the highest level, is a linked list of Group Cells 71, 72, 73, comprising one such cell for every group (of messages and/or segments) on the queue. From a Group Cell, there is a pointer 74 to a chain of one or more Message Cells 81, 82, 83, comprising a linked list of one such Message Cell for every message in that group. From the Message Cell, in this example, there is a pointer 84 to a chain of one or more Segment Cells 91, 92. If the message is segmented, there is a Segment Cell for every segment comprising the message.

So for a group of 3 unsegmented messages in a group, there will be a Group Cell with a chain of 3 Message Cells, but no Segment Cells. For an Ungrouped Message comprising 5 segments, there will be a Group Cell, with a single Message Cell, from which there will be a chain of 5 Segment Cells.

Each Group Cell includes the Group ID 75 generated by the putting application and queue manager as part of the message descriptor. Within the Group Cell there are also Status Flags, including a Group Locked flag 76, and a Group Lock Key field 77.

When the application now locks a single segment or group message, the fact that it is part of a group is evident from the presence of group related Message Flags in the Message Space Table entry. This causes the individual physical message to be locked conventionally (as described above). The Group Lock is applied by setting the Group Locked state bit within the Group Cell, and recording the Message Sequence number of the physical message on which the lock is based in the Group Lock Key field.

On any attempt to browse a message which is found (from the Message Flags in its Space Table entry) to be a member of a group or a segment of a composite message, the Group Map is consulted. Once the appropriate Group Cell has been found, the Group Lock bit is checked. If the Group Lock bit is found to be set, the group is locked. The Group Cell's Group Lock Key is compared with the key in the browse cursor. If no match is found, then this entire group is held to be locked by a different handle, and access is denied. If a match is found, the access attempt is by the holder of the lock, and the access is permitted.

Even if the message on which the lock is based is destructively retrieved, the group remains locked, as the Group Lock bit remains on, and the Message Sequence number of the message on which the lock was originally based continues to be held in the Group Cell's Group Lock Key, and in the key in the browse cursor, even though that message no longer exists.

When the last message or segment in the group is destructively retrieved, the Group Cell is destroyed, and the group is then automatically unlocked. The queue handle key is also set to a reserved value at the time.

The Group Lock as described is only suitable for an exclusive lock. A simple extension for a shared lock would maintain a count of those sharing in the Group Cell, and would give the key to all requesters.

As described, the lock is applied to the entire group. By moving the Group Lock bit and the Group Lock Key down into the Message Cell structure, locking can be done only on segments of a message rather than the entire group.

Figure 8:
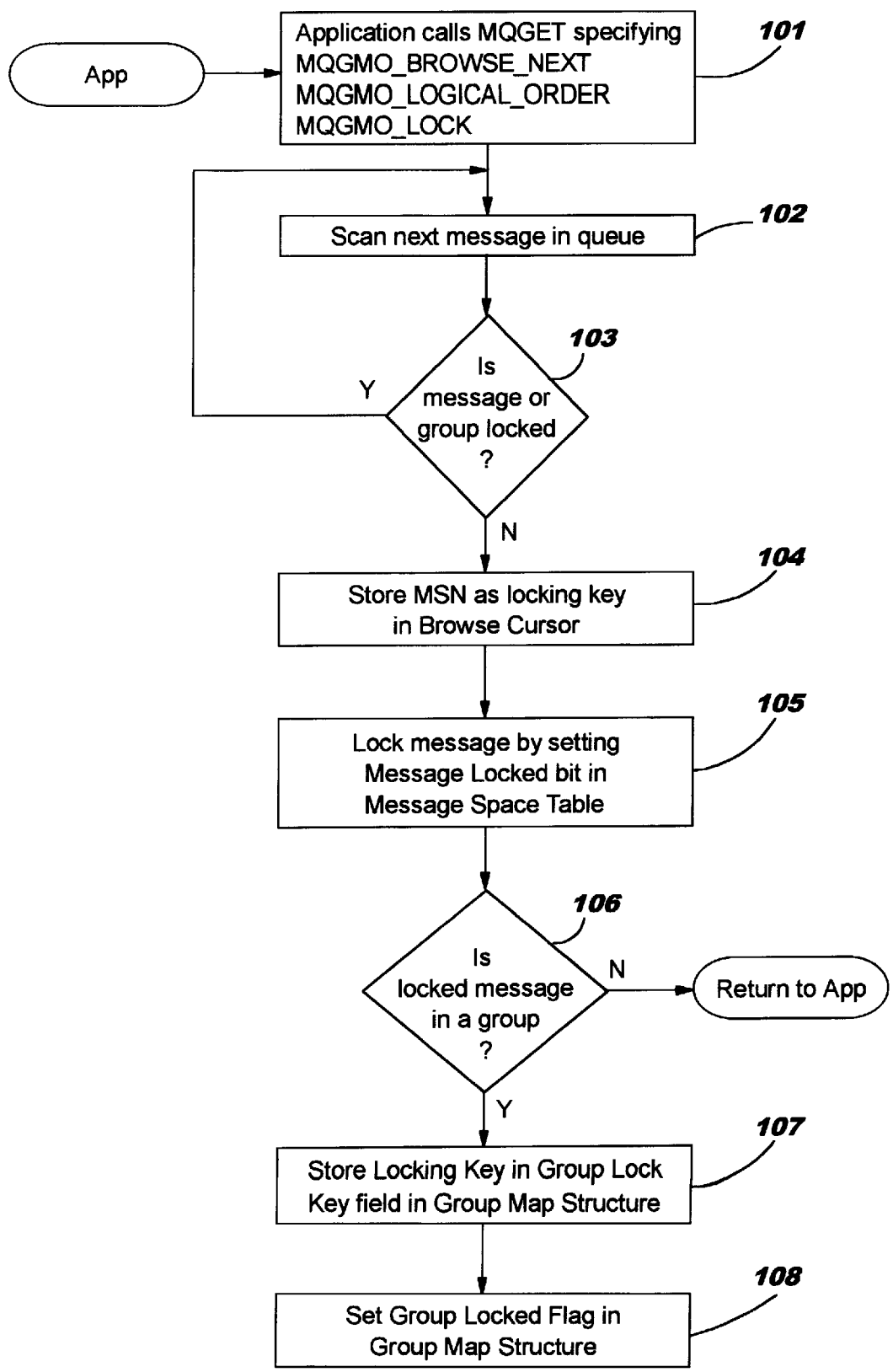
FIG. 8 is a flow diagram of a method of controlling access to related groups of data items in a message queuing system by locking, according to the present invention.

In somewhat more detail, the locking of a group will now be described by reference to FIG. 8. The starting point is an application APP, which expects to find a grouped message and thus issues (in step 101) an MQGET call specifying the browse option, MQGMO_BROWSE_NEXT, the logical order option, MQGMO_LOGICAL_ORDER, and the lock option, MQGMO_LOCK.

The browse cursor, is positioned initially at the first message in the queue and scans the corresponding Message Space Table entry in step 102. Before it can obtain and lock a message of interest, it must first know that the scanned message is not already locked by referring to the message locked bit 55 in the Space Table 50. Even if the message is not marked as locked, it may be a member of a locked group, indicated by group related message flags 54 in the space table. These tests that the message is unencumbered are made in step 103. If the message and/or its group is locked by another object handle, the cursor proceeds to the next message entry in the Space Table until it eventually finds the message of interest which the application wishes to lock.

In this embodiment, the queue Message Sequence Number is not available from the Space Table entry and the Message ID hash is not an absolute guarantee that the required message has been found. So the full message is read into a cache known as the Message Table, which contains full Message Details, including the full message ID, Group ID and queue Message Sequence Number. The Message Sequence Number is obtained and, in step 104, is stored as the locking key for this particular message in key field 34 of the Browse Cursor.

In step 105, the message is marked as locked by setting the Message Locked bit 55 in the Message Space Table.

In step 106, whether or not the locked message is in a group is determined by reference to the flags 54 of the Space Map Table. If not, the locking of a single message is complete and control returns to the application. If the locked individual message is a member of a group, the appropriate Group Cell is identified by reference to the full Group ID in the Message Details and, in step 107, the same Message Sequence Number is stored as a locking key in field 77 and the Group Locked flag bit is set in field 76 (step 108) to complete the group locking process.

Figure 9:
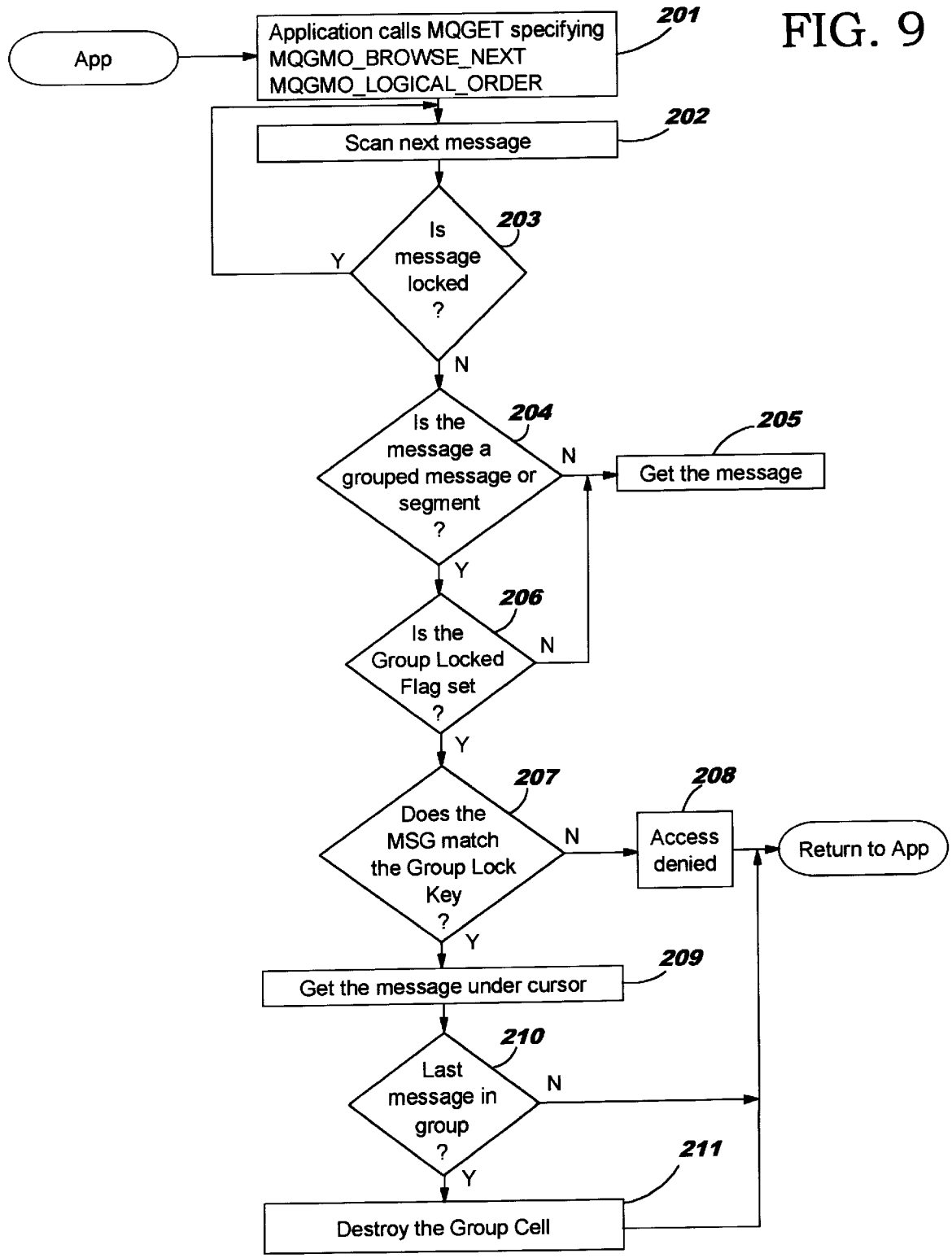
FIG. 9 is a flow diagram illustrating the steps of accessing data items which have been locked by the method of claim 8.

The operation of the system when an application attempts to get a message which may be locked either individually or as part of a group will now be described with reference to FIG. 9. It is assumed that the application issues in step 201 an MQGET call specifying the MQGMO_BROWSE_NEXT option and the MQGMO_LOGICAL_ORDER option. The Browse Cursor responds by positioning itself (step 202) on the next message, whose Space Map entry is checked in step 203 for a Message Locked bit. If the message is locked by another object handle, the Browse Cursor loops to continue traversing the queue. If it is not locked, in step 204, the Space Table entry is further examined to see if the message is part of a group or is a segment. If not, the message is retrieved by means of an MQGET_MESSAGE_UNDER_CURSOR operation in step 205. If however, the message is grouped or a segment, the Message Details are obtained from cache, the appropriate Group Cell is identified and, in step 206, its Group Locked flag is tested. If the Group is not locked, then the message may be retrieved in step 205.

If the Group Locked flag is set, the Message Sequence Number held in the browse cursor key field 34 is compared with the Group Locked Key in step 207. If it is not identical, access is denied in step 208 and control is returned to the application. If it matches, then the message under the cursor may be retrieved in step 209, for processing by the application.

If the retrieved message is not the last in the group, as indicated by message flags 54, control is returned to the application to decide whether it wants the remaining messages in the group. If however, this was the last message in the group, the Group Cell may be destroyed, in step 211, as grouped messages are retrieved in logical order.

We claim:

1. In a multiprocessing computer system in which any of a plurality of processes may store individual data items in a queue and any of a plurality of processes may retrieve data items from said stored queue for processing, said data items including at least one group of data items individually designated as being part of a group, whereby members of said group may not necessarily be stored serially and contiguously in said queue so that their precise location in the queue is unknown, a method of controlling access to such a group, comprising the steps of:

accessing an individual data item on said queue as part of a process;

determining that said item is designated as part of a group of related items; and locking said group of related items by marking the whole group as locked and returning an unlocking key to said process such that further access to any item of said group is prevented except on provision of said key, said locking of said group occurring in response to the accessing of any one of said individual items in that group.

2. A method as claimed in claim 1 including the further step of creating a shared data structure for said group, said locking step comprising setting a group locked flag in said group data structure, said further access to the individual data items of the group including the step of checking whether said group locked flag is set or not.

3. A method as claimed in claim 2 including the step of storing said locking key in said group data structure for comparison with the key provided in said further access requests.

4. A method as claimed in claim 1 or 2 or 3, including claim including the steps of individually marking said first accessed data item as locked.

5. A method as claimed in claim 4 including the step of generating said locking key in response to locking of said first accessed data item, said locking key including data unique to said data item.

6. A method as claimed in claim 5 in which said unique data includes a sequence number indicating the order in which the first accessed data item was put on the queue.

7. A method as claimed in claim in which a queue is opened by a process and returns a handle which must be used in subsequent accesses of the queue, said locking key being a combination of said handle and said sequence number of said first data item on the queue.

8. A method as claimed in claim 5 in which said locking key survives removal of said first accessed data item from said queue.

9. A method as claimed in claim 2 wherein said data structure includes cells for every member of said group, said cells having pointers to each other.

10. A method as claimed in claim 1 wherein said multiprocessing computer system imposes a maximum size on said data items and splits any oversized data item into a plurality of segment data items, the segment data items from each said split data item constituting one of said groups.

11. A method, as claimed in claim 1, wherein, in said multiprocessing computer system, the related data items forming said at least one group are designated as such by one of said processes.

12. A method as claimed in claim 1 in which the computer system includes a message queuing system in which the data items are messages, said accessing step being part of a browse operation to access said messages non-destructively.

13. An access control system for use in a multiprocessing computer system in which any of a plurality of processes may store individual data items in a queue and any of a plurality of processes may retrieve data items from said stored queue for processing, said data items including at least one group of data items individually designated as being part of a group, whereby members of said group may not necessarily be stored serially and contiguously in said queue so that their precise location in the queue is unknown, said access control system comprising:

means for accessing an individual data item on said queue as part of a process;

means for determining that said item is designated as part of a group of related items; and means for locking said group of related items in response to the accessing of any one of said individual items in that group by marking the whole group as locked and returning an unlocking key to said process such that further access to any item of said group is prevented except on provision of said key.

14. An access control system as claimed in claim 13 including a shared data structure for said group and wherein said means for locking comprises means for setting a group locked flag in said group data structure, said system further comprising means for checking whether said group locked flag is set or not.

15. A access system as claimed in claim 14 including means for storing said locking key in said group data structure for comparison with the key provided in said further access requests.

16. An access control system as claimed in claim 14 wherein said data structure includes cells for every member of said group, said cells having pointers to each other.

17. An access control system as claimed in claim 13 wherein said multiprocessing computer system imposes a maximum size on said data items and includes means for splitting any oversized data items into a plurality of segment data items, the segment data items from each said split data items constituting one of said groups.

18. An access control system as claimed in claim 13 wherein said multiprocessing computer system includes means responsive to one of said processes for designating related data items as a group.

19. An access control system as claimed in claim 13 including means for individually marking said first accessed data item as locked.

20. An access control system as claimed in claim 13 including means for generating said locking key in response to locking of said first accessed data item, said locking key including data unique to said data item.

21. An access control system as claimed in claim 20 in which said unique data includes a sequence number indicating the order in which the first accessed data item was put on the queue.

22. An access control system as claimed in claim 21 including means, responsive to the opening of a queue to return a handle which must be used in subsequent accesses of the queue, said locking key being a combination of said handle and said sequence number of said first data item on said queue.

23. An access control system as claimed in claim 13 in which said locking key survives removal of said first accessed data item from said queue.

24. An access control system as claimed in claim 13 in which the data items are messages in a message queuing system, being part of said multi-processing computer system.

25. A computer program recorded on a medium, said program for use in a multiprocessing computer system in which any of a plurality of processes may store individual data items in a queue and any of a plurality of processes may retrieve data items from said stored queue for processing, said data items including at least one group of data items individually designated as being part of a group, whereby members of said group may not necessarily be stored serially and contiguously in said queue so that their precise location in the queue is unknown, said computer program comprising:

means for accessing an individual data item on said queue as part of a process;

means for determining that said item is designated as part of a group of related items; and means for locking said group of related items in response to the accessing of any one of said individual items in that group by marking the whole group as locked and returning an unlocking key to said process such that further access to any item of said group is prevented except on provision of said key.

26. A computer program as claimed in claim 25 including a shared data structure for said group and wherein said means for locking comprises means for setting a group locked flag in said group data structure, said system further comprising means for checking whether said group locked flag is set or not.

27. A computer program as claimed in claim 26 including means for storing said locking key in said group data structure for comparison with the key provided in said further access requests.

28. A computer program as claimed in claim 26 wherein said data structure includes cells for every member of said group, said cells having pointers to each other.

29. A computer program as claimed in claim 25 wherein said multiprocessing computer system imposes a maximum size on said data items and includes means for splitting any oversized data items into a plurality of segment data items, the segment data items from each said split data items constituting one of said groups.

30. A computer program as claimed in claim 25 wherein said multiprocessing system includes means responsive to one of said processes for designating related data items as a group.

31. A computer program as claimed in claim 25 including means for individually marking said first accessed data item as locked.

32. A computer program as claimed in claim 31 in which said unique data includes a sequence number indicating the order in which the first accessed data item was put on the queue.

33. A computer program as claimed in claim 32 including means, responsive to the opening of a queue to return a handle which must be used in subsequent accesses of the queue, said locking key being a combination of said handle and said sequence number of said first data item on said queue.

34. A computer program as claimed in claim 25 including means for generating said locking key in response to locking of said first accessed data item, said locking key including data unique to said data item.

35. A computer program as claimed in claim 25 in which said locking key survives removal of said first accessed data item from said queue.

36. A computer program as claimed in claim 25 in which the data items are messages in a message queuing system, being part of said multi-processing computer system.

* * * * *

UNITED STATES PATENT AND TRADEMARK OFFICE
CERTIFICATE OF CORRECTION

PATENT NO.    : 6,226,641 B1                                                          Page 1 of 1
DATED         : May 1, 2001
INVENTOR(S)   : Andrew Hickson et al.

It is certified that error appears in the above-identified patent and that said Letters Patent is hereby corrected as shown below:

Column 9,
Line 16, replace "in claim 1 or 2 or 3, including" with -- in claim 1 or 2 or 3, --.
Line 17, replace "claim including" with -- including --.
Line 26, replace "in claim in which" with -- in claim 5 in which --.

Signed and Sealed this

Twelfth Day of March, 2002

Attest:

JAMES E. ROGAN
Attesting Officer        Director of the United States Patent and Trademark Office